United States Patent
Burkley et al.

(10) Patent No.: US 10,058,825 B2
(45) Date of Patent: Aug. 28, 2018

(54) FOAM MIXING SYSTEM AND METHODS

(71) Applicant: Nordson Corporation, Westlake, OH (US)

(72) Inventors: Brian Burkley, Duluth, GA (US); Raymond M. Fetcenko, Avon Lake, OH (US); Charles P. Ganzer, Cumming, GA (US); Derrick O'Kelley, Lawrenceville, GA (US); Jeffrey E. Owen, Suwanee, GA (US); Leslie J. Varga, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 265 days.

(21) Appl. No.: 14/966,119

(22) Filed: Dec. 11, 2015

(65) Prior Publication Data

US 2016/0166996 A1 Jun. 16, 2016

Related U.S. Application Data

(60) Provisional application No. 62/090,977, filed on Dec. 12, 2014.

(51) Int. Cl.
| | |
|---|---|
| *B01F 3/00* | (2006.01) |
| *B01F 3/04* | (2006.01) |
| *B01F 15/00* | (2006.01) |
| *B01F 15/02* | (2006.01) |
| *B29B 7/74* | (2006.01) |

(52) U.S. Cl.
CPC ...... *B01F 3/04439* (2013.01); *B01F 3/04446* (2013.01); *B01F 3/04992* (2013.01); *B01F 15/00136* (2013.01); *B01F 15/00162* (2013.01); *B01F 15/00415* (2013.01); *B01F 15/024* (2013.01); *B29B 7/7414* (2013.01); *B29B 7/7428* (2013.01)

(58) Field of Classification Search
CPC ............ B01F 15/00136; B01F 3/04446; B01F 3/04439; B01F 3/04992; B01F 15/00162; B01F 15/00415; B01F 15/024; B29B 7/7414; B29B 7/7428
See application file for complete search history.

(56) References Cited

U.S. PATENT DOCUMENTS

| | | |
|---|---|---|
| 4,778,631 A | 10/1988 | Cobbs, Jr. et al. |
| 4,779,762 A | 10/1988 | Klein et al. |

(Continued)

*Primary Examiner* — Anshu Bhatia
(74) *Attorney, Agent, or Firm* — Baker & Hostetler LLP

(57) ABSTRACT

Foam dispensing systems and methods are disclosed. Such systems and methods may include a foamed material dispenser, a dynamic mixer having a gas input, a process material input, and a foamed material output. The foamed material output may be in fluid communication with the foamed material dispenser. A pump having an output may be in fluid communication with the process material input of the dynamic mixer, and a gas injection valve may be in fluid communication with the gas input of the dynamic mixer. A gas pressure regulator may be coupled between the pressurized gas supply and the gas injection valve, and a gas injection cycle timer may be operatively connected to the gas injection valve, the gas injection cycle timer causing the gas injection valve to pulse open and closed to send pulses of pressurized gas into the dynamic mixer through the gas input.

9 Claims, 3 Drawing Sheets

(56) References Cited

U.S. PATENT DOCUMENTS

| | | | |
|---|---|---|---|
| 5,056,034 A * | 10/1991 | Rucki | B29B 7/72 |
| | | | 261/DIG. 26 |
| 5,480,589 A | 1/1996 | Belser et al. | |
| 5,480,597 A * | 1/1996 | Ishida | B01F 15/0429 |
| | | | 261/DIG. 26 |
| 5,874,031 A | 2/1999 | Okuda et al. | |
| 7,703,705 B2 | 4/2010 | Ganzer | |
| 9,038,921 B2 | 5/2015 | Ganzer | |
| 2007/0051832 A1 * | 3/2007 | Jones | B29B 7/481 |
| | | | 239/398 |
| 2009/0236025 A1 | 9/2009 | Burkus et al. | |

* cited by examiner

FOAM MIXING SYSTEM AND METHODS

CROSS-REFERENCE TO RELATED APPLICATION

This application claims the benefit of U.S. Provisional Patent Application Ser. No. 62/090,977, filed on Dec. 12, 2014, the disclosure of which is incorporated by reference herein in its entirety.

TECHNICAL FIELD

The present invention relates generally to systems and methods for producing and dispensing foamed materials by mixing a gas with a viscous process material.

SUMMARY

In a first illustrative embodiment the invention provides a foam dispensing system including a foamed material dispenser and a dynamic mixer having a gas input, a process material input and a foamed material output. The foamed material output is coupled in fluid communication with the foamed material dispenser. A pump is provided with an output coupled in fluid communication with the process material input of the dynamic mixer for supplying process material to the dynamic mixer. A pressurized gas supply provides gas to a gas injection valve coupled in fluid communication with the gas input of the dynamic mixer. A gas pressure regulator is coupled between the pressurized gas supply and the gas injection valve. A gas injection cycle timer is operatively connected to the gas injection valve. The gas injection cycle timer causes the gas injection valve to pulse open and closed to send pulses of pressurized gas into the dynamic mixer through the gas input.

The system can include various additional or alternative features. For example, a process material pressure regulator is coupled between the pump output and the process material input. A first check valve is located proximate the process material input and prevents process material in the dynamic mixer from exiting through the process material input. A second check valve is located proximate the foamed material output and prevents foamed material from re-entering the dynamic mixer through the foamed material output after the foamed material has exited the foamed material output. A rate at which the gas injection valve is pulsed open and closed may be manually set using the gas injection cycle timer. A process material flow meter is coupled between the pump output and the process material input of the dynamic mixer. The flow meter is operatively coupled with the gas injection timer and causes a cycle rate at which the gas injection valve is pulsed open and closed to automatically vary in accordance with a variance in the process material flow detected by the process material flow meter.

In another illustrative embodiment, a foam dispensing system includes a foamed material dispenser and a dynamic mixer having a gas input, a process material input and a foamed material output. The foamed material output is coupled in fluid communication with the foamed material dispenser. A pump includes an output coupled in fluid communication with the process material input of the dynamic mixer for supplying process material to the dynamic mixer. A process material pressure regulator is coupled between the pump output and the process material input. A process material flow meter is coupled between the pump output and the process material input of the dynamic mixer. A mass flow controller is coupled in fluid communication with the gas input of the dynamic mixer and controls the mass of the pressurized gas flowing into the gas input from the pressurized gas supply. A gas pressure regulator is coupled between the pressurized gas supply and the mass flow controller. A first check valve is located proximate the process material input and prevents process material in the dynamic mixer from exiting through the process material input. A second check valve is located proximate the foamed material output and prevents foamed material from re-entering the dynamic mixer through the foamed material output after the foamed material has exited the foamed material output. A process controller is operatively coupled to the mass flow controller and the process material flow meter. The process controller processes signals from the process material flow meter indicative of the flow rate of process material to the process material input and adjusts the mass flow controller to produce a desired density reduction of the process material in the dynamic mixer.

As additional aspects, first pressure transducer may be positioned downstream of the gas pressure regulator to detect the pressure of the gas between the gas pressure regulator and the mass flow controller. A second pressure transducer may be positioned downstream of the process material flow meter to detect the pressure of the process material between the process material flow meter and the process material input of the dynamic mixer. The first and second pressure transducers are operatively coupled to the process controller, and the process controller compares pressure readings taken by the first and second pressure transducers for ensuring that the gas and process material pressures are within an operational range.

In another aspect, the invention provides a method of controlling the gas content of a foamed material dispensed from a foamed material dispensing apparatus including a dynamic mixer for mixing process material and gas to form the foamed material, a process material pump, a pressurized gas supply, and a foamed material dispenser. The method includes directing pressurized gas from the pressurized gas supply to a gas input of the dynamic mixer. Process material is directed from the process material pump to a process material input of the dynamic mixer. The method further includes pulsing amounts of pressurized gas directed into the dynamic mixer through the gas input. The process material and the pressurized gas are mixed in the dynamic mixer to produce the foamed material. The foamed material is directed from a foamed material output of the dynamic mixer to a foamed material dispenser, and the foamed material is then dispensed with the foamed material dispenser.

The method may include additional or alternative aspects or steps. For example, pulsing the amounts of pressurized gas further comprises cycling a gas injection valve open and closed. A cycle timer is used to set a rate at which the amounts of pressurized gas are pulsed into the gas input of the dynamic mixer, for example, by setting a rate at which the gas injection valve is cycled open and closed. Process material in the dynamic mixer is prevented from exiting through the process material input, and foamed material is prevented from re-entering the dynamic mixer through the foamed material output after the foamed material has exited the foamed material output. A process material flow rate into the process material input of the dynamic mixer is detected, and the method further includes varying a rate of pulsing the amounts of pressurized gas in accordance with a detected variance in the process material flow rate.

In another aspect, the invention provides a method of controlling the gas content of a foamed material dispensed from a foamed material dispensing apparatus including a dynamic mixer for mixing process material and gas to form the foamed material, a process material pump, a pressurized gas supply, and a foamed material dispenser. The method includes directing pressurized gas from the pressurized gas supply to a gas input of the dynamic mixer, and directing process material from the process material pump to a process material input of the dynamic mixer. The process material and the pressurized gas are mixed in the dynamic mixer to produce the foamed material. Process material in the dynamic mixer is prevented from exiting through the process material input. Foamed material is prevented from re-entering the dynamic mixer through the foamed material output after the foamed material has exited the foamed material output. The foamed material is directed from a foamed material output of the dynamic mixer to a foamed material dispenser, and the foamed material is dispensed with the foamed material dispenser.

This method may also include additional or alternative aspects. For example, a mass flow controller coupled in fluid communication with the gas input of the dynamic mixer controls the mass of the pressurized gas flowing into the gas input. A process material flow meter coupled between the pump output and the process material input of the dynamic mixer detects the flow rate of the process material flowing to the process material input. The method further comprises processing signals from the process material flow meter indicative of the flow rate of process material to the process material input, and adjusting the mass flow controller to produce a desired density reduction of the process material in the dynamic mixer based at least in part on the processed signals. The method further includes detecting the pressure of the gas entering the gas input of the dynamic mixer, and detecting the pressure of the process material entering the process material input of the dynamic mixer. The detected pressures of the gas and the process material are compared to determine if the gas and process material pressures are within an operational range.

Various additional features and advantages of the invention will become more apparent to those of ordinary skill in the art upon review of the following detailed description of the illustrative embodiments taken in conjunction with the accompanying drawings.

DETAILED DESCRIPTION

Figure 1:
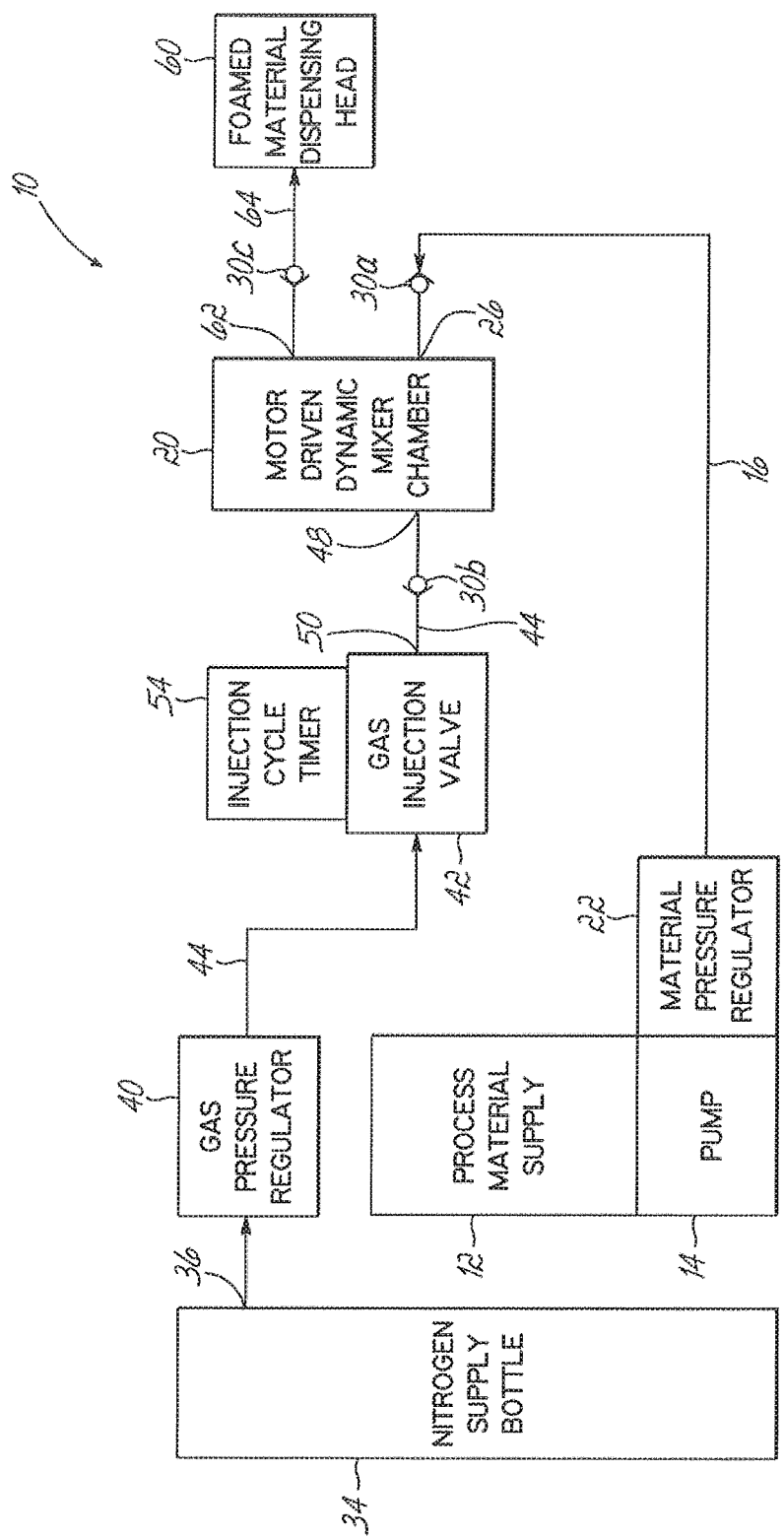
FIG. 1 is a schematic block diagram of a first illustrative embodiment of a mixing and dispensing system for producing and dispensing a foamed material.

With regard to the various embodiments described below, like reference numerals will refer to like elements or components and therefore repeated descriptions of such elements or components for each embodiment after the first is not necessary. FIG. 1 is a schematic block diagram of a first illustrative system 10 constructed in accordance with an embodiment of the invention. This system 10 is designed to mix a high viscosity liquid process material, such as a sealant or an adhesive, at a high pressure with a gas, such as nitrogen, at a predetermined ratio to produce and dispense a foamed material having a desired density reduction relative to the initial process material. Systems to which the various aspects of the present invention are applied may be of the type previously disclosed in U.S. Pat. Nos. 4,778,631; 4,779,762; 5,056,034; and 7,703,705, the disclosures of which are hereby fully incorporated by reference herein. The system 10 includes a process material supply 12 coupled with a pump 14 from which the process material is directed through a hose or line 16 to the input of a dynamic mixer 20. The dynamic mixer 20 may be of the design disclosed in U.S. Pat. No. 7,703,705, incorporated above.

A process material pressure regulator 22 is coupled between the output of the pump 14 and the input 26 of the dynamic mixer 20 for regulating or adjusting the process material pressure to the desired pressure level for entering the dynamic mixer 20. A check valve 30*a* is located in the line 16 leading to the dynamic mixer process material input 26 and is preferably located directly at or proximate the process material input 26, as shown. The purpose of this check valve 30*a* will be discussed further below. A pressurized gas supply 34, such as a nitrogen supply tank or bottle is provided and includes a pressurized gas output 36 coupled to a gas pressure regulator 40 for regulating or adjusting the gas pressure down to a desired level. A gas injection valve 42 is coupled in fluid communication with a gas input line 44 and the gas pressure regulator 40. The gas injection valve 42 directs the pressurized gas into a gas input 48 of the dynamic mixer 20. A check valve 30*b* is located between an output 50 of the gas injection valve 42 and the gas input 48 of the dynamic mixer 20 for preventing gas and liquid from exiting the dynamic mixer 20. An injection cycle timer 54 is operatively coupled to the gas injection valve 42 and serves to cycle the gas injection valve open and closed in accordance with a setting chosen by the operator, as will be described below.

A foamed material dispensing head or dispenser 60 is coupled to a foamed material output 62 of the dynamic mixer 20 by an output line 64, and a third check valve 30*c* is coupled in fluid communication with the foamed material output 62. This check valve 30*c* is located directly at or proximate the foamed material output 62 and prevents foamed material that has exited the dynamic mixer output 62 from reentering the mixer 20. More specifically, check valves 30*a* and 30*c* keep the process material and resulting foamed materials pressures balanced in the hydraulic circuit when the foamed material dispenser or dispensing head 60 is closed. That is, these check valves 30*a*, 30*c* hold the process material and foam material pressures constant.

Without the check valves 30*a*, 30*c*, the pressures of the process material in the material input line 16 and the foamed material in the output line 64 would equalize over the lengths of those flow paths. The check valve 30*a* located proximate the process material input 26 of the dynamic mixer 20 prevents process material from backing up toward the material pressure regulator 22 when the dispenser or dispensing head 60 is closed. Prior to using check valve 30*a*; upon opening the dispensing head 60 during a dispensing operation, any foamed material that had exited the process material input 26 during this pressure equalization would feed back into the mixer 20 and the result would be that of introducing too much gas into the dynamic mixer 20 during that dispensing operation. This would result in inaccurate density reduction during the foaming or mixing process and possibly low quality foam dispensing, such as large bubbles and spitting or popping at the outlet of the dispensing head 60. The check valve 30*c* located proximate the foamed material output 62 of the dynamic mixer 20 helps prevent large gas bubbles from forming in the output line 64 by maintaining high pressure upon closing of the dispensing head or dispenser 60 after a dispensing operation. If the check valve 30c was not used, foamed material will exit the dynamic mixer 20 even upon closing of the dispensing head 60 as the pressure equalizes along the output line 64 leading to the dispensing head 60. After a length of time, the minute gas bubbles, which are essentially in solution in the foamed material, will agglomerate and become larger bubbles. In a subsequent dispensing operation, these large bubbles will result in low quality foam dispensing, such as with popping of the large bubbles as they are dispensed from the dispensing head 60.

The cycle timer 54 is may be used to pulse the opening and closing of the injection valve 42. For example, the cycle timer 54 may be manually set to a predetermined and desired cycle rate for opening and closing the gas injection valve 42. The timer 54 is initiated upon opening the dispense head or dispenser 60 during a dispensing operation and it is stopped when the dispense head or dispenser 60 is closed to stop the dispensing operation. During the cycled on and off actuations of the gas injection valve 42, small amounts of pressurized gas are pulsed into the gas input 48 through the check valve 30b. The pulse rate may be chosen based on several different factors, such as the type of material being foamed, parameters of the dispensing operation, and the density reduction desired. For most common materials, a valve cycle rate of five seconds open and five seconds closed appears to work well. Pulsing of the pressurized gas into the dynamic mixer 20 provides a fine adjustment on the gas pressure and evens out the spikes in pressure that otherwise occur due to the inherent hysteresis of the gas pressure regulator 40. That is, the gas pressure downstream from the regulator 40 will tend to spike up and down and this can negatively affect the accuracy of the material density reduction in the dynamic mixer 20. Therefore, it has been found that pulsing the gas balances out these spikes in pressure and results in more accurate process material density reduction.

There are a number of variables involved in the process of introducing nitrogen gas into viscous liquid process materials in order to produce foamed material. Some of the key variables include:

Process material, its viscosity and molecular structure
Nitrogen gas pressure
Process material pressure
Application temperature
Flow rate of the process material through the system
Dispense cycle duration and rate
Gas injection valve cycle duration and pulse rate
Residence time of gas and process material in the dynamic mixer
Target density reduction Within the category of process materials, below are listed the most common material types that are candidates for the foaming process. Within each material category there are many different formulations. Representative materials are listed below only as examples, along with the approximate range of pressure, viscosity and temperature that is required to enable the foaming process.

| Process Material Type | Application Pressure Range psi | Application Viscosity Range Cp | Density Reduction Range % | Process Temperature Range F. |
|---|---|---|---|---|
| PSA (Pressure Sensitive Adhesives) hot melts | 400-600 | 200-1200 | 40-60 | 325-400 |
| PUR (Poly Urethane Reactive) (moisture cure) hot melts | 500-700 | 1000-1500 | 40-60 | 250-300 |
| Polyamide hot melts | 500-700 | 1000-2500 | 40-60 | 380-450 |
| EVA (Ethylene Vinyl Acetate) hot melts | 500-750 | 1000-3000 | 40-65 | 250-400 |
| Butyls | 750-1000 | 5000-25000 | 40-60 | 350-400 |
| Urethanes | 750-1200 | 2500-10000 | 40-70 | 72-200 |
| Silicones | 750-1200 | 2000-20000 | 40-60 | 72 |
| Polyolefins | 400-700 | 500-1500 | 40-70 | 150-350 |
| Plastisols | 400-700 | 500-1500 | 40-50 | 72 |

There are other process materials that may be used in the systems disclosed and covered herein, as well as other equipment settings. Normally, the gas pressure is regulated to be to approximately 50 psi to 150 psi above the process material hydraulic pressure.

Figure 2:
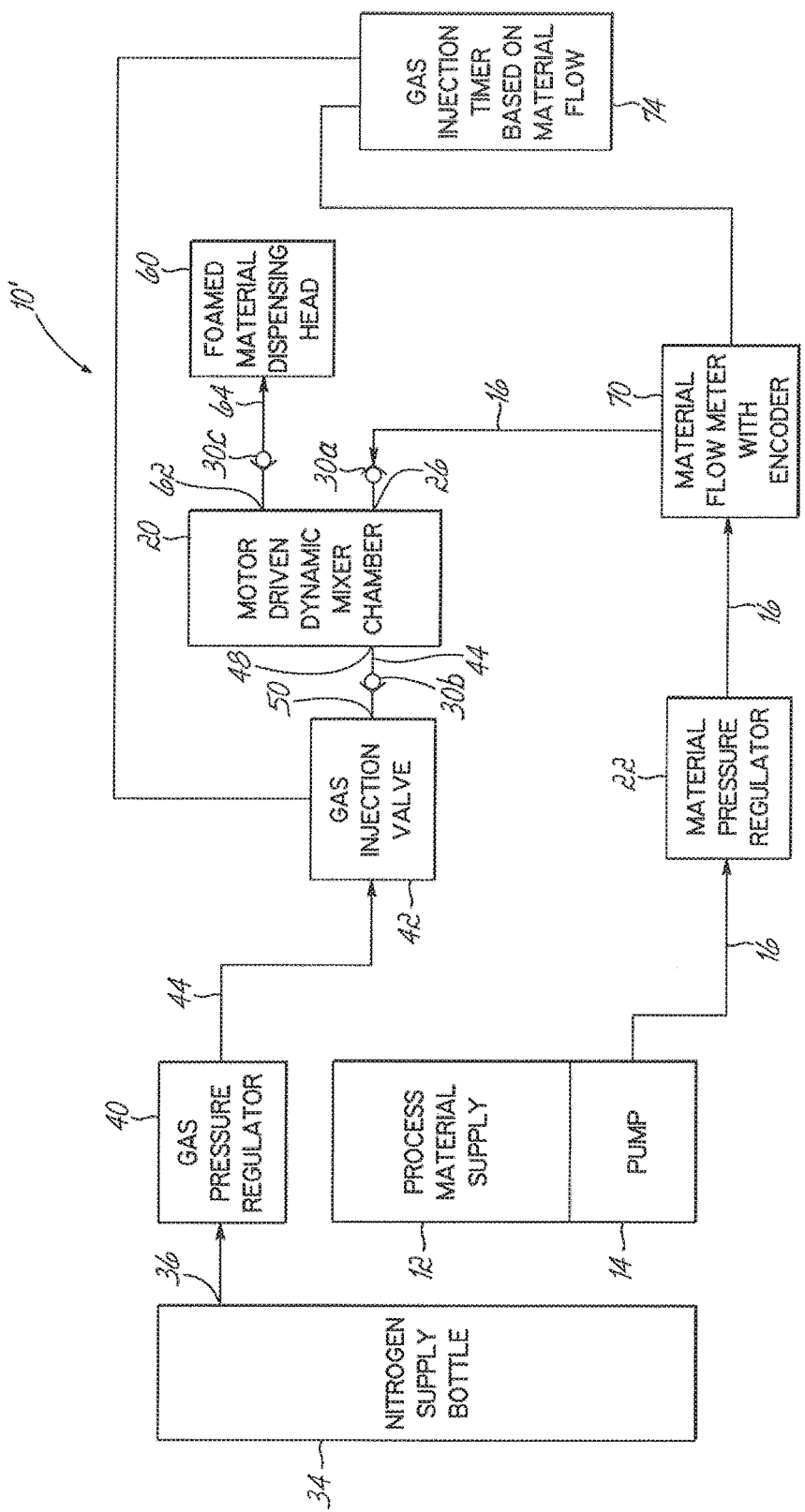
FIG. 2 is a schematic block diagram of a second illustrative embodiment of a mixing and dispensing system for producing and dispensing a foamed material.

FIG. 2 is an alternative embodiment of a system 10' that is similar to the embodiment of FIG. 1, however, a process material flow meter 70 has been added in the process material supply line 16 between the material pressure regulator 22 and the check valve 30a. This material flow meter 70 is electronically coupled to a gas injection timer 74 such that the output signals from the flow meter 70 which are proportional to the flow rate of process material from the pump 14 are received by the gas injection timer 74. This gas injection timer 74 is, like the timer 54 of the first embodiment, manually set at a desired cycle rate for opening and closing the gas injection valve 42, however, it will automatically adjust the cycle rate upward or downward based on the detected flow rate of process material. During higher flow conditions, for example, the cycle rate will be automatically increased and cause the gas injection valve to pulse open and closed more quickly, while during lower flow rate conditions, such as on system start up, the cycle rate will be automatically adjusted downward such that the gas is pulsed more slowly into the dynamic mixer 20.

Figure 3:
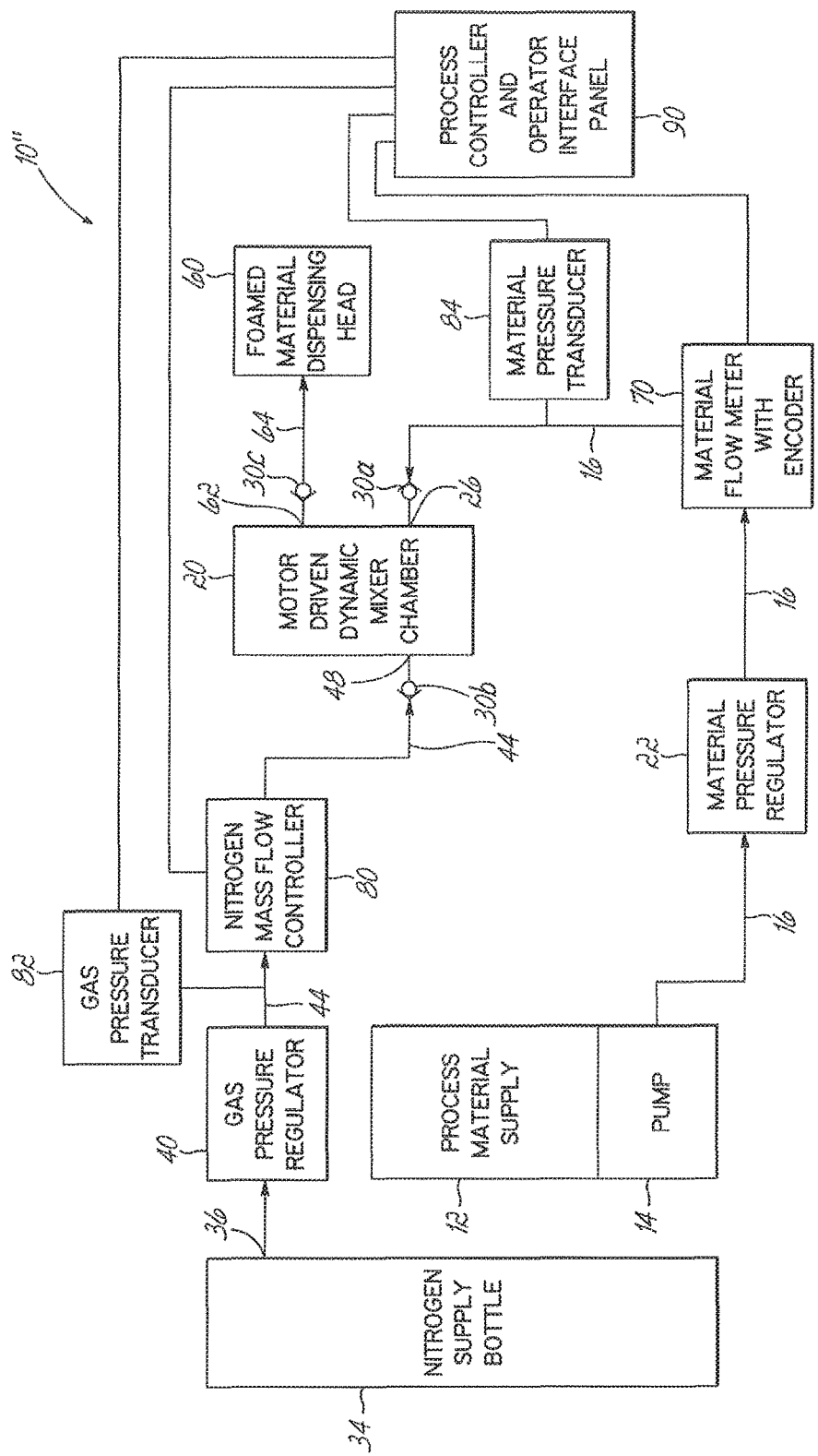
FIG. 3 is a schematic block diagram of a third illustrative embodiment of a mixing and dispensing system for producing and dispensing a foamed material.

FIG. 3 illustrates another embodiment of a system 10". This system 10" adds a gas mass flow controller 80, and a pair of pressure transducers 82, 84. One pressure transducer 82 is coupled between the gas pressure regulator 40 and the gas mass flow controller 80 and the other pressure transducer 84 is coupled in the process material input line 16. A process controller 90 including operator interface panel is also provided, and may be a computer or other CPU, for example, for allowing an operator to choose the desired process material density reduction. This process controller 90 receives the signal output from the flow meter 70 indicative of the process material flow rate and, in accordance with a look-up table or algorithm, provides an output signal to the mass flow controller 80 to automatically set the amount or mass flow rate of gas flowing to the gas input 48 of the dynamic mixer 20. The specific algorithm or control method may generally be accomplished as described in U.S. Pat. No. 5,056,034, the disclosure of which is incorporated hereinabove. The gas pressure transducer 82 and the process material pressure transducer 84 provide signals to the process controller 90 proportional to the respective gas and material pressures at these locations in the system 10". The process controller 90 can thereby compare the pressures, such as by calculating a pressure differential and ensure that the pressure differential is at the desired level or that the respective pressures are otherwise within range. In this regard, if the material pressure entering the dynamic mixer 20 is not significantly higher than the gas pressure of the gas entering the dynamic mixer 20, then the gas will not be able to pass through the check valve 30b and a proper foam mixture will not be produced.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A foam dispensing system, comprising:
a foamed material dispenser;
a dynamic mixer having a gas input, a process material input and a foamed material output, the foamed material output coupled in fluid communication with the foamed material dispenser;
a pump having an output coupled in fluid communication with the process material input of the dynamic mixer for supplying process material to the dynamic mixer;
a pressurized gas supply;
a gas injection valve coupled in fluid communication with the gas input of the dynamic mixer;
a gas pressure regulator coupled between the pressurized gas supply and the gas injection valve; and,
a gas injection cycle timer operatively connected to the gas injection valve, the gas injection cycle timer causing the gas injection valve to pulse open and closed to send pulses of pressurized gas into the dynamic mixer through the gas input;
a first check valve located proximate the process material input interposed between the pump and the dynamic mixer and configured to prevent process material in the dynamic mixer from exiting through the process material input; and
a second check valve located proximate the foamed material output interposed between the dynamic mixer and the foamed material dispenser and configured to prevent foamed material from re-entering the dynamic mixer through the foamed material output after the foamed material has exited the foamed material output.

2. The system of claim 1, further comprising:
a process material pressure regulator coupled between the pump output and the process material input.

3. The system of claim 1, wherein a rate at which the gas injection valve is pulsed open and closed is manually set using the gas injection cycle timer.

4. The system of claim 1, further comprising:
a process material flow meter coupled between the pump output and the process material input of the dynamic mixer, the flow meter further operatively coupled with the gas injection cycle timer and causing a cycle rate at which the gas injection valve is pulsed open and closed to automatically vary in accordance with a variance in the process material flow detected by the process material flow meter.

5. The system of claim 4, further comprising:
a process material pressure regulator coupled between the pump output and the process material flow meter.

6. A foam dispensing system, comprising:
a foamed material dispenser;
a dynamic mixer having a gas input, a process material input and a foamed material output, the foamed material output coupled in fluid communication with the foamed material dispenser;
a pump having an output coupled in fluid communication with the process material input of the dynamic mixer for supplying process material to the dynamic mixer;
a process material pressure regulator coupled between the pump output and the process material input;
a process material flow meter coupled between the pump output and the process material input of the dynamic mixer;
a pressurized gas supply;
a mass flow controller coupled in fluid communication with the gas input of the dynamic mixer and controlling the mass of the pressurized gas flowing into the gas input from the pressurized gas supply;
a gas pressure regulator coupled between the pressurized gas supply and the mass flow controller;
a first check valve located proximate the process material input interposed between the pump and the dynamic mixer and configured to prevent process material in the dynamic mixer from exiting through the process material input; and
a second check valve located proximate the foamed material output interposed between the dynamic mixer and the foamed material dispenser and configured to prevent foamed material from re-entering the dynamic mixer through the foamed material output after the foamed material has exited the foamed material output; and
a process controller operatively coupled to the mass flow controller and the process material flow meter, the process controller operative to process signals from the process material flow meter indicative of a flow rate of process material to the process material input and adjust the mass flow controller to produce a desired density reduction of the process material in the dynamic mixer.

7. The system of claim 6, further comprising:
a first pressure transducer positioned downstream of the gas pressure regulator and operating to detect the pressure of the gas between the gas pressure regulator and the mass flow controller; and
a second pressure transducer positioned downstream of the process material flow meter and operating to detect the pressure of the process material between the process material flow meter and the process material input of the dynamic mixer,
the first and second pressure transducers further being operatively coupled to the process controller, wherein the process controller compares pressure readings taken by the first and second pressure transducers for ensuring that the gas and process material pressures are within an operational range.

8. A foam dispensing system, comprising:
a foamed material dispenser;
a dynamic mixer having a gas input, a process material input and a foamed material output, the foamed material output coupled in fluid communication with the foamed material dispenser;

a pump having an output coupled in fluid communication with the process material input of the dynamic mixer for supplying process material to the dynamic mixer;

a pressurized gas supply;

a gas injection valve coupled in fluid communication with the gas input of the dynamic mixer;

a gas pressure regulator coupled between the pressurized gas supply and the gas injection valve;

a first check valve located proximate the process material input interposed between the pump and the dynamic mixer and configured to prevent process material in the dynamic mixer from exiting through the process material input; and a second check valve located proximate the foamed material output interposed between the dynamic mixer and the foamed material dispenser and configured to prevent foamed material from re-entering the dynamic mixer through the foamed material output after the foamed material has exited the foamed material output.

9. The system of claim 8, further comprising:

a process material pressure regulator coupled between the pump output and the process material input.

* * * * *